United States Patent [19]
Friedrich et al.

[11] Patent Number: 5,465,650
[45] Date of Patent: Nov. 14, 1995

[54] COMBO GRINDER AND BREWER

[75] Inventors: Brent R. Friedrich, Springfield; John T. Knepler, Chatham, both of Ill.

[73] Assignee: Bunn-O-Matic Corporation, Springfield, Ill.

[21] Appl. No.: 371,293

[22] Filed: Jan. 11, 1995

[51] Int. Cl.$^6$ ..................................................... A47J 31/42
[52] U.S. Cl. ............................. 99/286; 99/289 R; 99/290
[58] Field of Search ......................... 99/286, 290, 289 R, 99/295, 299, 300, 304, 305, 306, 307, 316, 279, 280, 281, 282; 426/433

[56] References Cited

U.S. PATENT DOCUMENTS

| | | | |
|---|---|---|---|
| 3,203,340 | 8/1965 | Totten | 99/289 R |
| 3,530,787 | 9/1970 | Litterio | 99/289 R |
| 4,172,413 | 10/1979 | Roseberry | 99/286 |
| 4,841,849 | 6/1989 | Shimomura | 99/286 |
| 4,971,259 | 11/1990 | Nidiffer . | |
| 5,186,399 | 2/1993 | Knepler et al. . | |
| 5,241,898 | 9/1993 | Newnan | 99/289 R |

*Primary Examiner*—Robert W. Jenkins
*Attorney, Agent, or Firm*—Trexler, Bushnell, Giangiorgi & Blackstone, Ltd.

[57] ABSTRACT

A beverage brewing apparatus which includes a substance dispensing device and a brewing device. The brewing apparatus includes a receptacle for receiving a brewing substance from the substance dispensing device, a movable chute positioned between the substance dispensing device and the receptacle, and a water dispensing system operatively associated with the brewing device and selectively communicating with the receptacle for delivering water to a brewing substance retained therein. Additionally, a drive assembly is provided to operatively displace the water dispensing device relative to the receptacle. When the water dispensing device is positioned in communication with the receptacle, the chute is moved out of communication with the receptacle. When the water dispensing device is removed from communication with the receptacle, the chute is placed in communication with the receptacle. The present invention also includes a seal attached to the water dispensing device to seal the water dispensing device while dispensing water to prevent the escape of moisture from the water dispensing device. The apparatus includes a sensor for detecting when a funnel is not present for brewing a beverage or when the funnel has not been recharged and replaced after brewing a beverage and upon initiating a subsequent beverage brewing cycle.

22 Claims, 4 Drawing Sheets

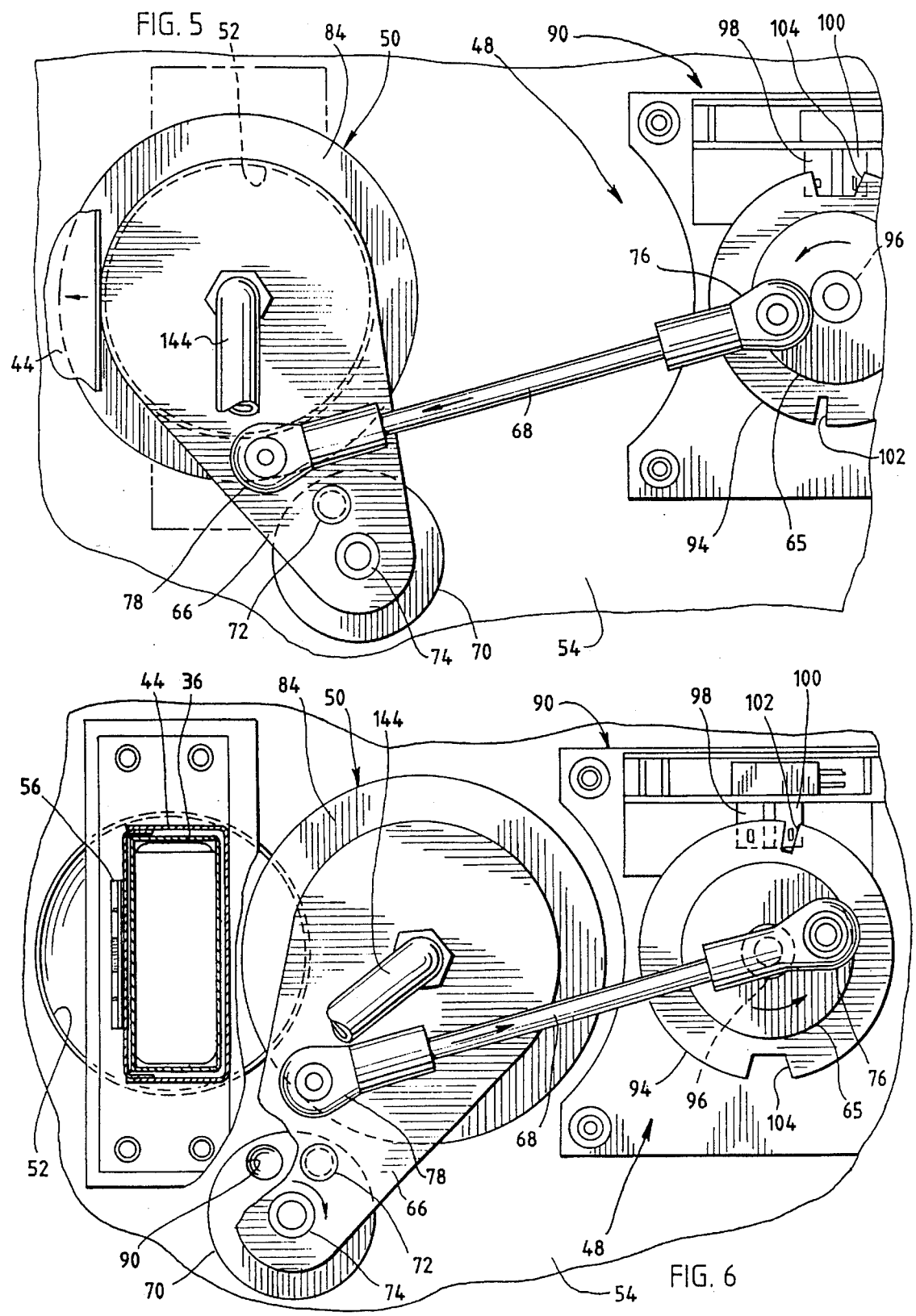

COMBO GRINDER AND BREWER

BACKGROUND

The present invention relates to brewing apparatus for producing a brewed beverage from a beverage brewing substance. More particularly, the present invention includes a beverage brewing apparatus having a brewing device and a substance dispensing device.

In recent years it has become increasingly popular for restaurants, franchise operations and other food service institutions to serve fresh brewed coffee from "fresh-ground" coffee beans. This popularity has created an increasing demand for coffee bean grinders to provide such fresh ground coffee. A variety of coffee grinders are available from a variety of manufacturers which store a large quantity of beans for dispensing to a grinding mechanism. In many settings, one grinder will be used to grind both regular coffee and decaffeinated coffee. These dual purpose grinders include two hoppers and a mechanism for selectively dispensing beans from one of the hoppers.

Many grinders provide structures for retaining a brewing funnel or receptacle near the outlet of the grinder so as to catch the grounds as they are dispensed from the grinder. User selectable controls are provided to allow a user to select a predetermined quantity of coffee. Also, grinders have been developed which interactively weigh the ground coffee dispensed from the grinders so as to accurately produce a required quantity of coffee.

A problem with the prior art devices is that an operator is required to carry out several steps in order to brew coffee. For example, the operator must prepare a brewing funnel with a filter paper, position the brewing funnel on the grinder to catch the ground coffee dispensed by the grinder, select a quantity of coffee to be ground, activate the grinder, remove the brewing funnel and ground coffee from grinder and place the brewing funnel in the brewing device, and set up the brewing device for the desired volume of brewed coffee and initiate the brewing cycle. The numerous steps in setting up and initiating the brew cycle as well as the placement, removal and replacement of the brewing funnel create many opportunities for problems to arise and errors to occur.

For example, if the funnel is not carefully moved from the grinder to the brewer the grounds could be spilled or contaminated. Additionally, the quantity of coffee ground by the grinder and the volume of coffee to be brewed at the brewer is prone to operator error and could be incorrectly set up. In other words, if an operator selects a quantity of ground coffee sufficient to brew a full pot of coffee, and then sets up the brewer to brew a half pot of coffee, the half pot of coffee will be undesirably strong since half the quantity of brewing water is used with a quantity of ground sufficient to brew a full pot. Similarly, too little ground coffee can be used with too much water resulting in a weak and often times bitter tasting brewed beverage.

The food preparation industry is striving for greater and greater automation to reduce errors, provide greater consistency, and increase efficiency. The current coffee brewing technology generally provides a satisfactory beverage when the coffee brewing devices are properly operated. When an operator does not comply with the prescribed procedures, available technology may not provide optimal results. As such, it would be desirable to provide a coffee brewing apparatus which minimizes the potential for operator error and increases efficiency.

Another problem with the prior art device is that the independent grinder and brewer require considerable counter space. In many areas of the food preparation industry, store space and especially counter space is at a premium. If the footprint for various essential equipment such as coffee grinding and brewing devices could be minimizes, another food preparation device could placed in the excess space or the excess space could be used for additional food preparation or other product sales. As such, it would be desirable to minimize the counter space requirement, or footprint, of a coffee brewing apparatus and grinder so as to reduce the space requirements for coffee brewing and thus provide more space for other purposes.

OBJECTS AND SUMMARY

A general object satisfied by the present invention is to provide a coffee brewing apparatus which combines a brewing device and brewing substance dispensing device in one apparatus.

Another object satisfied by the present invention is to provide a coffee brewing apparatus which minimizes potential operator error and increases efficiency.

Yet a further object satisfied by the present invention is to provide a unitary coffee brewing apparatus which includes a brewing device and brewing substance dispensing device and which prevents moisture from affecting a store of coffee retained in the dispensing device.

Still a further object satisfied by the present invention is a coffee brewing apparatus which provides an indication to an operator whether a brewing funnel is properly positioned in the apparatus and whether the brewing funnel needs to be checked before initiating a brew cycle.

Briefly, and in accordance with the foregoing, the present invention envisions a beverage brewing apparatus which includes a substance dispensing device and a brewing device. The brewing apparatus includes a receptacle for receiving a brewing substance from the substance dispensing device, a movable chute positioned between the substance dispensing device and the receptacle, and a water dispensing device operatively associated with the brewing device and selectively communicating with the receptacle for delivering water to a brewing substance retained therein. Additionally, a drive assembly is provided to operatively displace the water dispensing device relative to the receptacle. When the water dispensing device is positioned in communication with the receptacle, the chute is moved out of communication with the receptacle. When the water dispensing device is removed from communication with the receptacle, the chute is placed in communication with the receptacle. The present invention also includes a seal attached to the water dispensing device to seal the water dispensing device while dispensing water to prevent the escape of moisture from the water dispensing device. The apparatus includes a sensor for detecting when a funnel is not present for brewing a beverage or when the funnel has not been recharged and replaced after brewing a beverage and upon initiating a subsequent beverage brewing cycle.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 5 is a partial fragmentary, cross-sectional, plan view taken along line 4—4 in FIG. 2 showing the sprayhead assembly positioned over an aperture communicating with a receptacle;

FIG. 6 is similar to the view as shown in FIG. 4 in which the drive assembly has moved the sprayhead assembly away from the aperture to facilitate movement of the chute in position to communicate with the aperture.

DETAILED DESCRIPTION OF THE PREFERRED EMBODIMENT

Figure 1:
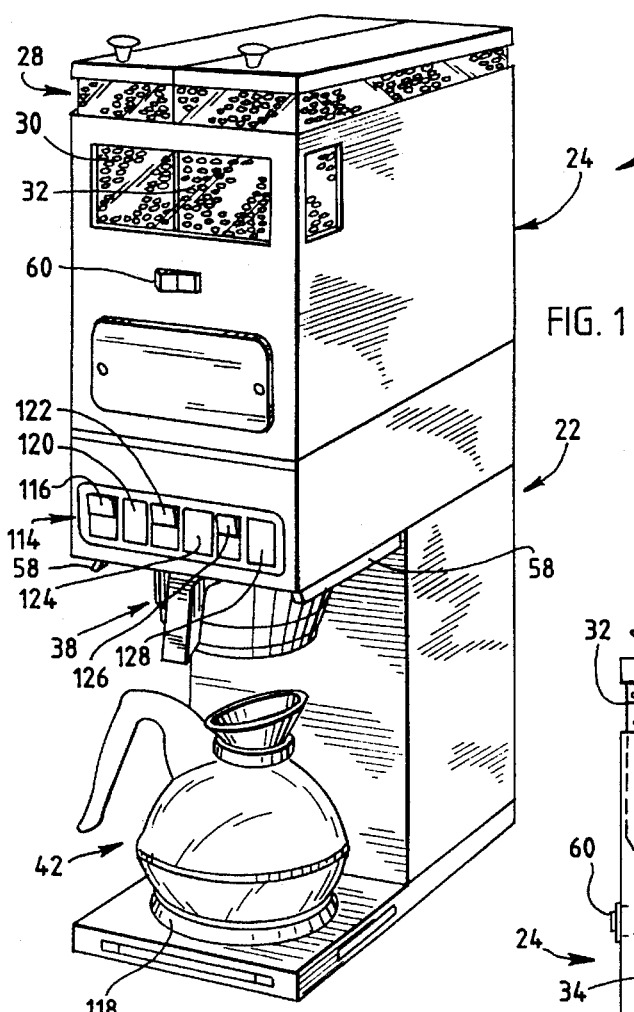
FIG. 1 is a perspective view of a beverage brewing apparatus including a brewing substance dispensing device and a brewing device.

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 2:
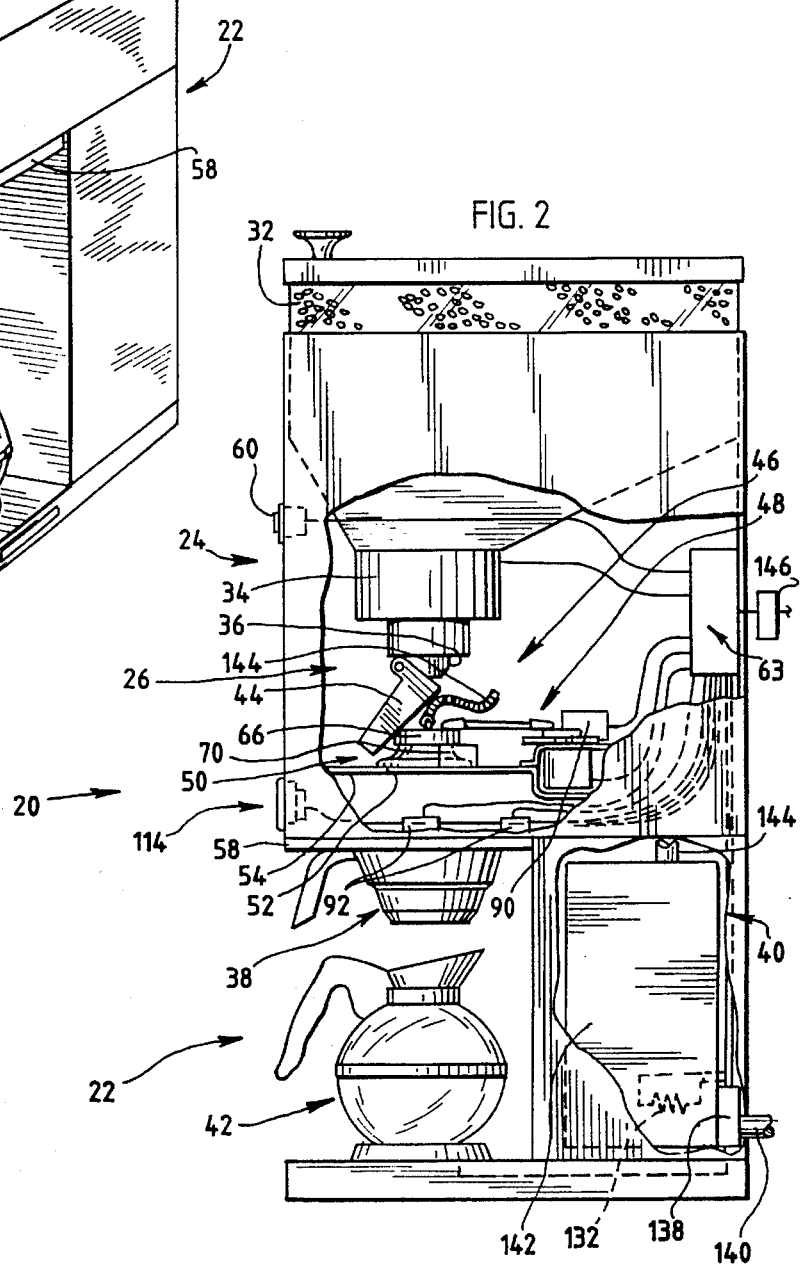
FIG. 2 is a partial fragmentary, cross-sectional, side elevational view of the beverage brewing apparatus as shown in FIG. 1.

With reference to FIG. 1, a beverage brewing apparatus 20 is shown which includes a beverage brewing means or a beverage brewing device 22 and brewing substance dispensing means or a brewing substance dispensing device 24. As shown, the brewing substance dispensing device 24 is positioned above the beverage brewing device 22 so as to dispense a brewing substance to the beverage brewing device 22 in a gravity fed manner. With reference to FIG. 2, means for delivering water and dispensing brewing substance or water delivery and substance dispensing means 26 is provided in the beverage brewing apparatus 20 positioned generally between the brewing substance dispensing device 24 and the beverage brewing device 22 for controllably directing a brewing substance from the dispensing device 24 to the brewing device 22 and delivering water to the brewing device, or individually dispensing brewing substance to the brewing device or delivering water to the brewing device.

The dispensing device 24 includes a receptacle 28 which is shown in the illustrated embodiment as including a first hopper 30 and a second hopper 32. The illustrated embodiment shows whole bean coffee retained in the hoppers 30, 32 in a gravity feed relationship with a grinder 34 (see FIG. 2). Whole bean coffee is fed from a selected one of the hoppers 30, 32 into the grinder 34 which grinds the beans to a desired consistency and dispenses the brewing substance through an outlet port 36. Brewing substance dispensed through the outlet port 36 must be deposited in a brewing substance receptacle or funnel 38 for infusion with water from a water distribution system 40. The hoppers 30, 32 and grinder 34 as well as the water distribution system 40 are of generally known construction such as can be found in coffee brewers and grinders manufactured by Bunn-O-Matic Corporation of Springfield, Ill., assignee of the present invention. When the brewing substance, retained in the funnel 38, is infused with water from the water distribution system 40 a brewed beverage is dispensed from the funnel into a decanter 42 positioned below the funnel 38.

The present invention focuses on the water delivery and substance dispensing means 26 which is generally positioned between the substance dispensing device 24 and the brewing device 22. Generally shown in FIG. 2, and more specifically shown in FIGS. 3–6, the water delivery and substance dispensing means 26 includes a chute 44, water dispensing means 46 and drive means 48. The drive means 48 is attached to a sprayhead assembly 50 of the water dispensing means 46 to pivotally, horizontally and vertically displace the sprayhead assembly 50 relative to an aperture 52 formed in the body 54 of the brewing device 22. Operation of the drive means 48 and the water dispensing means 46 will be described in further detail hereinbelow.

In general terms, the chute 44 is pivotally attached to the outlet port 36 and leans against the sprayhead assembly 50. When the drive means 48 moves the sprayhead assembly 50 away from its position over the aperture 52 the chute 44, leaning against the sprayhead assembly 50, moves into a position whereby the chute 44 provides a path from the outlet port 36 through the aperture 52 to the funnel 38.

Referring now to FIGS. 5 and 6, FIG. 5 shows the sprayhead assembly 50 in engagement over the aperture 52 with the chute (only a fragmentary portion of chute 44 is shown in FIG. 5) positioned away from the aperture 52. The arrangement as shown in FIG. 5 allows water to be dispensed from the sprayhead assembly 50 through the aperture 52 to the funnel 38 below. When the drive means 48 is operated to move the sprayhead assembly 50 out of communication with the aperture 52, the chute 44 pivots into position aided by a spring hinge 56 to mate with the outlet port 36 and provide a path from the grinder 34 to the funnel 38.

In the general operation of the present invention, the funnel 38 is removed and a filter material is placed in the funnel 38. The funnel is slidably engaged with funnel supporting rails 58. The funnel supporting rails 58 retain the funnel 38 in a position below the aperture 52 for receiving ground coffee and water therethrough. A selection switch 60 is operated to select the type of coffee from the hoppers 30, 32. Next, a brew switch is activated which operates a control device 62 to selectively control the water delivery and substance dispensing means 26. Generally, the control means 63 operates the drive means 48 to displace the sprayhead assembly 50 allowing the chute 44 to drop into position between the outlet port 36 and the aperture 52.

The grinder 34 is operated for a predetermined period of time to grind whole bean coffee and dispense coffee grounds through the outlet port 36. The grounds pass from the outlet port 36 through the chute 44 and aperture 52 and into the funnel 38 positioned therebelow. At the end of the grind cycle, the control means operates the drive means 48 to position the sprayhead assembly 50 over the aperture 52 pushing the chute 44 out the way while pivoting. The control means 63 then operates the water distribution system 40 to dispense water through the spray head assembly 50 onto the freshly ground coffee retained in the funnel 38. The ground coffee is infused by the water and a brewed substance is dispensed into the decanter 42.

The proceeding description has described the general structure and function of the present invention and the following description will now discuss the specific structure and function of the present invention. Turning to FIGS. 2–6, the drive means 48 includes a motor 64, a cam 65, a pivot lever 66, a linkage 68 connected at one end to the cam 65 and at an opposite end to the pivot lever 66, a pivot block 70 attached to the body 54 and positioned underneath the pivot lever 66, and a spring loaded plunger 72 retained in the pivot lever 66 and abutting the pivot block 70. The pivot lever 66 is attached to the pivot block 70 by a pivot shaft 74 which allows rotary movement of the pivot lever 66 relative to the fixed pivot block 70. The sprayhead assembly 50 is carried on the pivot lever 66 so that the sprayhead assembly 50 is pivoted into and out of communication with the aperture 52 upon moving the pivot lever 66.

The linkage 68 is attached to the cam 65 and the pivot lever 66 to provide reciprocating pivotal movement of the lever 66 relative to the block 70 and the aperture 52. In other words, the eccentric pivotal attachment of a first end 76 of the linkage 68 to the cam 64 reciprocates the pivot lever 66 attached to a second end 78 of the linkage 68. Rotary movement of the cam 65 eccentrically moves the first end 76 towards and away from the aperture 52. The size and dimension of the linkage 68 as well as the placement of the first and second end 76, 78 has been calculated so that the sprayhead assembly 50 is positioned over the aperture 52 when the pivot lever 66 is in a advanced position (as shown in FIG. 5) and that the sprayhead assembly 50 is disengaged from the aperture 52 to allow the chute 44 to communicate with the outlet port 36 and the aperture 52 when the pivot lever 66 is in a retracted position (as shown in FIG. 6).

Figure 3:
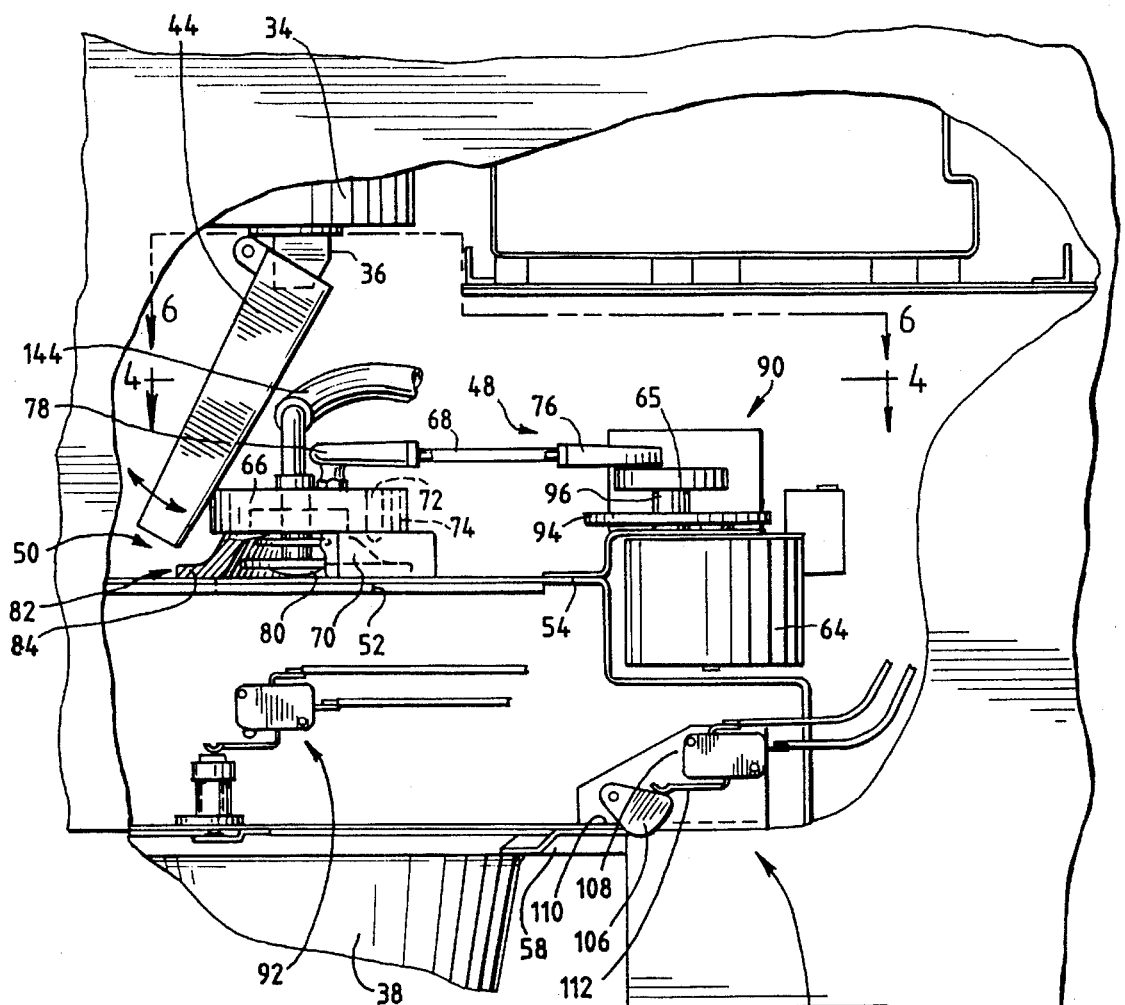
FIG. 3 is an enlarged view of the partial fragmentary, cross-sectional, side elevational view in FIG. 2 to show the details of a movable chute, sprayhead assembly and drive assembly of the present invention.
Figure 4:
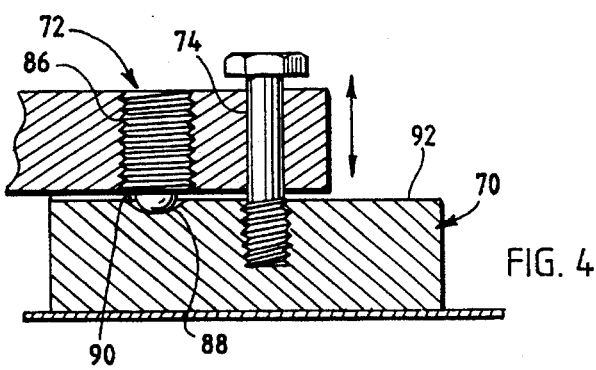
FIG. 4 is an enlarged, partial fragmentary, cross-sectional view of a portion of the drive assembly to show how the drive assembly vertically displaces the sprayhead assembly.

The sprayhead assembly 50 as shown in FIG. 3 include a sprayhead 80 and a skirt 82 attached to the pivot lever 66. A rim 84 of the skirt 82 extends radially away from the edge of the aperture 52 to provide a seal between the body 54 and the skirt 82. The seal prevents the escape of moisture into the brewing device 22 and the dispensing device 24. It is important to prevent the escape of moisture so that the components of the apparatus 20 are not adversely affected. On problem that occurs with the escape of moisture is clumping or clustering of the brewing substance in the hoppers. By reducing the escape of moisture from the sprayhead assembly, clumping is kept to a minimum and operational problems are prevented.

Accommodations must be made for the skirt 82 such that the sprayhead assembly 50 must be slightly vertically displaced when moving the pivot lever 66 to disengage the rim 84 from the body 54. The spring plunger 72 mentioned hereinabove is retained in the pivot lever 66 and acts against the block 70 to facilitate vertical displacement of the pivot lever 66 and attached sprayhead assembly 50. The spring plunger 72 is of known construction having a generally threaded body portion 86, a plunger head 88 and a biasing mechanism retained within the body 86 which acts against the plunger head. The biasing mechanism maintains the plunger head in an advanced position generally extending from the body 86. A recess 90 is formed in the surface 92 of the pivot block 70. The recess 90 is sized and dimensioned to receive the plunger head 88 and is positioned on the surface 92 such that the plunger head 88 is received therein when the pivot lever 66 is positioned in the advanced position (as shown in FIG. 5) in which the sprayhead assembly 50 communicates with the aperture 52. When the pivot lever 66 is reciprocated, the plunger head 88 rotates out of the recess 90 to slightly vertically displace the pivot lever 66 as it rides across the top surface 92 of the pivot block 70. The slight vertical displacement disengages the rim 84 from the body 54 thereby breaking the seal between the sprayhead assembly 50 to allow ease of movement.

A sensor assembly 90 is associated with the drive means 48 and coupled to the control means 63 to sense the position of the pivot lever 66. A receptacle sensor 92 is also provided to sense the position of the funnel 38 in the funnel rails 58. The sensor assembly 90 includes a sensor disk 94 attached to a shaft 96 coupling the cam 65 to the motor 64. Rotation of the cam 65 by the motor 64 results in the corresponding rotation of the sensor disk 94.

A first and a second detector 98, 100 are provided on the sensor assembly 90 to sense the position of the disk 94 by detecting the position of a first and second notch 102, 104. With reference to FIGS. 5 and 6, the detectors 98, 100 sense the second notch 104 thereby indicating that the spray head assembly 50 is positioned over the aperture 52. When the second detector 100 senses the first notch 102, the spray head assembly 50 is indicated as being disengaged from the aperture 52. The sensor assembly 90 provides feedback information to the control means 63 to indicate the position of the spray head assembly 50. The sensors 92 are also coupled to the control means 63 to provide information about the position of the funnel 38.

The receptacle sensor 92 includes a pivoting lever 106 associated with a switch 108. When the funnel 38 is in the forward most position in the funnel rails (as shown in FIG. 3) a forward lip 110 of the funnel displaces the lever 106 thereby contacting an actuator 112 of the switch 108 indicating the position of the funnel 38.

A switch panel 114 is provided in an easily accessible location such as on the front surface of the brewing apparatus 20 as shown in FIG. 1. The switch panel 114 includes a number of switches which are connected to the control means 63. A warmer switch 116 is provided to activate and deactivate a warmer plate 118 for warming the decanter 42. By coupling the warmer switch 116 to the control means 63, the warmer switch 116 acts to control the brew cycle. The warmer switch 116 must be activated before the brew cycle is initiated. A funnel check indicator 120 is a safety indicator which warns an operator to check the funnel before initiating a brewing cycle. The check funnel indicator 120 is preferably a light of known construction connected to the control means 63. The check funnel indicator 120 prevents brewing two cycles in a row without first removing the funnel and disposing of spent grounds. This indicator 120 is coupled to the control means 63 which will illuminate the indicator if the funnel sensor is not triggered between brewing cycles. In other words, if the funnel 38 is not removed at the end of a brewing cycle and an operator tries to initiate a new brewing cycle, the control means 63 will illuminate the check funnel since the sensor 92 has not been reset by removal and replacement of the funnel 38.

A "grind/brew" or "brew only" switch 122 allows an operator to choose to grind and brew coffee or to only brew coffee by selecting one of the two choices at the switch 122. If the "grind/brew" selection is made at the switch 122, once the brew cycle is activated the dispensing device 124 will dispense a quantity of ground coffee sufficient to brew a required quantity of coffee into the funnel 38. the "brew only" selection is made at switch 122, the dispensing device 24 will be locked out and prevented from operation. The "brew only" selection at the switch 122 requires a user to place user selected grounds in the funnel 38 or the apparatus 20 to brew a beverage.

A "funnel out" indicator 124 is coupled to the control means 63 to indicate when the funnel is not in place between the funnel rails 58. When the funnel 38 is not in place, the "funnel out" indicator will be illuminated by the control means which is coupled to the funnel sensors 92. If the control means 63 illuminates the "funnel out" indicator 124, the dispensing device 24 and brewing device 22 are locked out from operation until the funnel condition is checked and the funnel sensor 92 indicates that the funnel is in place.

A "start brew" cycle switch 126 must be pressed to initiate a brew cycle. The switch 126 will send a signal to the control means 63 indicating that the operator wishes to initiate a brewing cycle. If the other conditions discussed hereinabove have not been met, the control means will not allow a brew cycle to begin. This will require the user to check the preceding switches and indicators to make sure that the appropriate selections have been made. If all the preceding conditions have been met, the brew cycle will initiate upon actuating the start switch 126.

A final indicator on the switch panel 114 is a "ready" light 128 which indicates when the water in the water distribution system 40 is at an appropriate temperature. The "ready" indicator 128 is coupled to the control means 63 which senses temperature in the water distribution system 40 by well known temperature sensing techniques such as thermocouples or thermostats.

Figure 7:
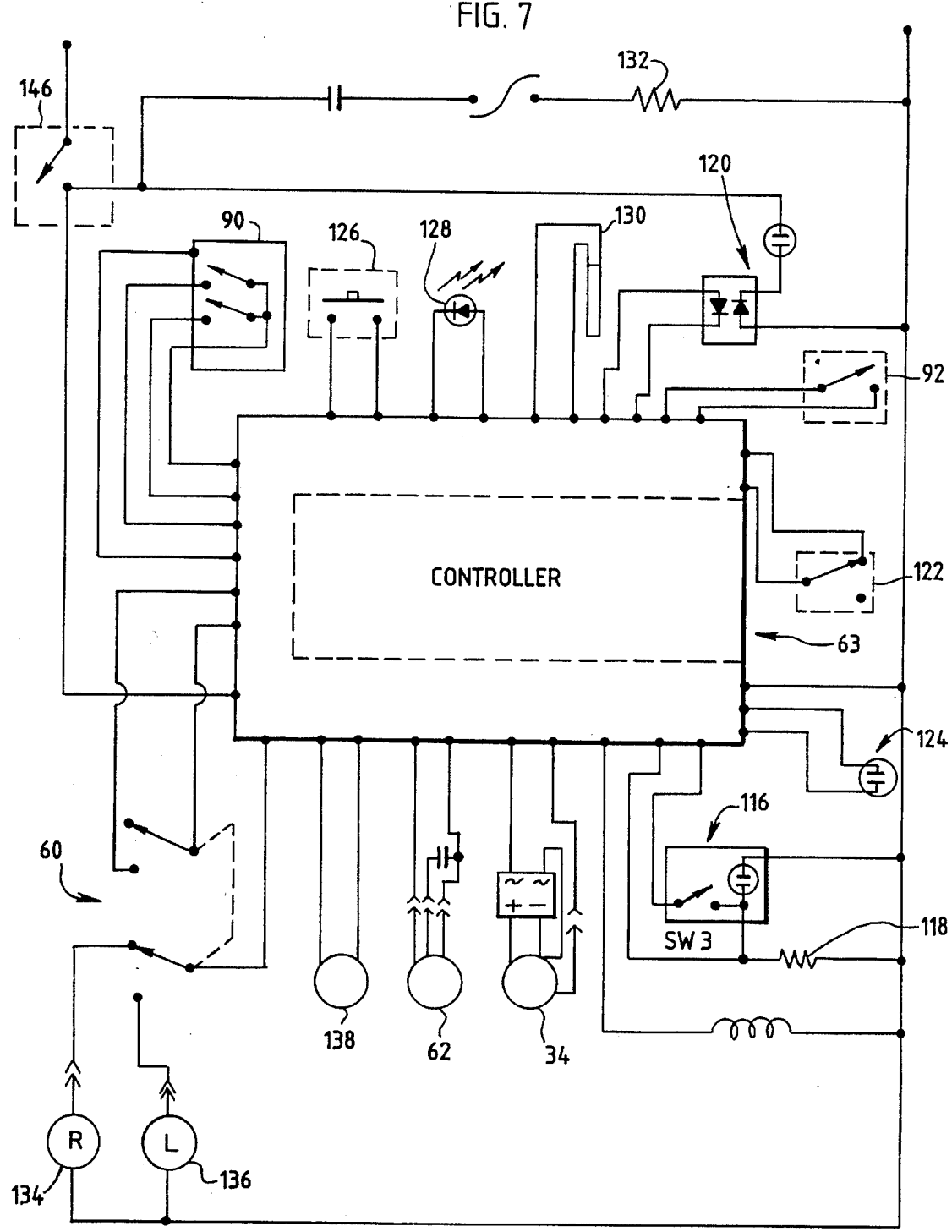
FIG. 7 is a schematic diagram of the beverage brewing apparatus of the present invention.

Turning now to FIG. 7, the control means 63 is shown connected to the numerous switches and devices of the beverage brewing apparatus 20. As shown in FIG. 7, a thermostat 130 is coupled to the control means 63. A thermostat is disposed relative to the water distribution system 40 to sense the temperature of the water used in brewing the beverage. A reservoir heater 132 is connected to the overall circuit. The reservoir heater is associated with the water distribution system 40 in a known manner so as to heat the water retained in a reservoir of the water distribution system. The "ready" indicator 128 is coupled to the controller 63 and is responsive to the thermostat 130 such that when the thermostat indicates a desired temperature is achieved, the "ready" light 128 is activated. When the temperature falls outside of a desired range of temperatures, the thermostat 130 senses the deviation and the controller 63 activates the reservoir heater 132 in response to the thermostat 130.

The warmer switch 116 is coupled to the controller 63 which activates the warmer 118 when the switch 116 is operated.

The funnel switch 92 is coupled to the controller 63 and indicates when the funnel 38 is in the funnel rails 58. The controller activates the "funnel out" indicator 124 when the funnel switch 92 indicates that the funnel is missing from the rails 58.

The grinder selection switch 60 is operated to select one of the hoppers 30, 32. Hopper solenoids 134, 136 operate a dispensing mechanism in corresponding hoppers 30, 32, respectively. The dispensing mechanisms are of known construction such as slide gates which are operated by solenoids. When the grinder selection switch 60 is activated, one of the dispensing mechanisms 134, 136 will operate to dispense beans from the selected hopper 30, 32 to the grinder 34. The grinder 34 is coupled to the control means 63 and is operated for a predetermined period of time to grind the beans dispensed from one of the selected hoppers 30, 32.

Prior to the operation of the grinder 34, the drive motor 64 which is coupled to the controller 63 must be operated to move the spray head assembly 50 away from the aperture 52. The spray head position sensor assembly 90 is coupled to the controller 63 to indicate the position of the pivot lever 66 and provide feedback to the controller 63. Once the spray head assembly 50 is positioned away from the aperture 52, the chute 44 drops into place. When the sensor assembly 90 indicates that the spray head assembly is thus positioned, the grinder 34 is actuated to start grinding beans from the selected hopper.

The grinder 34 operates for a predetermined period of time corresponding to the selected quantity of coffee to be brewed whereupon the dispensing device 134, 136 for the selected hopper is actuated to close the feed from the selected hopper. The grinder 34 is operated to clear out the dispensed bean and, if desirable, provide an overgrind to clear out any fines or chaff. After a preset dwell time, the motor 62 is actuated to position the spray head assembly 50 over the aperture 52 in preparation for infusing the freshly ground brewing substance with heated water from the water distribution system 40.

Once the sensor assembly 90 indicates that the spray head 50 is in the proper position over the aperture 52 an inlet water solenoid valve 138 coupled to an inlet water line 140 is operated to allow water to enter a reservoir 142 of the water distribution system 40 thereby forcing water through a water line 144 connected to the sprayhead 80. Water is dispensed through the spray head 80 over the grounds retained in the funnel 38 for a predetermined period of time at which point the solenoid valve 138 is operated by the controllers 63 to stop the inflow of water through the inlet line 140. Stopping the inflow of water from the inlet line 140 ceases the dispensing of water over the brewing substance thereby completing the water dispensing portion of the brewing cycle. A general power switch 146 is coupled to the circuit shown in FIG. 7 to provide power to the circuit.

In use, the beverage brewing apparatus 20 of the present invention is designed to grind whole bean coffee directly into the funnel 38 and brew up to a full decanter 42 of final product. First, the operator loads whole bean coffee into the hoppers 30, 32. Next, the operator selects the type of bean to be dispensed by use of the selection switch 60. The brew funnel 30 is removed from the rails 58 to remove any spent beverage brewing substance and place a fresh coffee filter therein. The funnel 38 is reinserted between the rails 58 and the lower warmer switch 116 is moved into the on position.

The "grind/brew-brew only" switch 122 is operated to grind coffee from the selected hopper. The start switch 126 is activated to initiate the brewing cycle. The brewing cycle will start as long as the prerequisites for brewing are met and the control means 63 acknowledges the satisfaction of these prerequisites.

The drive means 48 will then pivot the pivot lever 66 to move the spray head assembly 50 out of engagement with the aperture 52. As the motor 64 drives the drive means 48, the pivot lever 66 is slightly upwardly displaced by way of the spring loaded plunger 72 operating against the pivot block 70. The slight vertical displacement of the spray head assembly 50 disengages the seal formed between the rim 84 and the body 54.

As the spray head assembly 50 is pivoted away from the aperture 52, the chute 44 swings into position to dispense ground coffee from the grinder 34 directly through the aperture 52 into the funnel 38. Ground coffee is dispensed into the funnel 38 as described hereinabove. After a sufficient quantity of ground coffee has been dispensed, the grinder 34 is stopped and the motor 64 operates the drive means 48 to reposition the spray head assembly 50 over the aperture 52. As the pivot lever 66 rotates, the spring loaded plunger 72 moves until it engages the recess 90 formed in the upper surface 92 of the pivot block 70.

The sensor assembly 90 will indicate that the spray head assembly 50 is in the appropriate location whereupon the water distribution system 40 will deliver water through the water line 144 to the spray head 80 of the spray head assembly 50. Dispensing water onto the grounds in the funnel 38 will produce a brewed beverage which is dispensed into the decanter 42 therebelow. At the completion of the brewing cycle, the check funnel indicator 120 will be activated to inform the operator that the funnel needs to be checked before a new brewing cycle can begin. As previously discussed, the "grind/brew-brew only" switch 122 allows the apparatus 20 to be used as a brewer only or as grinder brewer as disclosed more specifically hereinabove. The interlock switch or funnel sensor 92 will lock out operation of the apparatus 20 if the funnel 32 is not properly positioned.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A beverage brewing apparatus including beverage brewing means and brewing substance dispensing means, said beverage brewing apparatus comprising:

a receptacle for retaining a beverage brewing substance;

said brewing substance dispensing means being operatively associated with said receptacle for controllably dispensing brewing substance into said receptacle;

a chute positioned between said substance dispensing means and said receptacle for selectively directing brewing substance from said substance dispensing means to said receptacle;

water dispensing means operatively associated with said beverage brewing means and selectively communicating with said receptacle for delivering water to a brewing substance retained in said receptacle; and drive means for selectively alternately moving one of said water dispensing means and said chute for controllably displacing the other of said water dispensing means and said chute, whereby said water dispensing means and said chute controllably, individually communicate with said receptacle.

2. A beverage brewing apparatus as recited in claim 1, further comprising:

said chute having at least one wall;

said substance dispensing means having an outlet port through which brewing substance is dispensed;

a hinge attached to said wall of said chute and proximate to said outlet port of said substance dispensing means, said chute being movable relative to said hinge for placing said chute in communication with said outlet port.

3. A beverage brewing apparatus as recited in claim 1, said brewing substance dispensing means further comprising a hopper and a brewing substance grinder positioned for receiving brewing substance from said hopper, said brewing substance grinder dispensing ground brewing substance to said chute.

4. A beverage brewing apparatus as recited in claim 1, said water dispensing means including a water line and a sprayhead attached to said water line, said sprayhead distributing water over brewing substance retained in said receptacle.

5. A beverage brewing apparatus as recited in claim 4, said water dispensing means further comprising:

sealing means associated with said sprayhead for preventing the escape of moisture from said water dispensing means.

6. A beverage brewing apparatus as recited in claim 5, wherein said drive means vertically displaces said spray head for disengaging said sealing means and horizontally displaces said spray head after disengaging said sealing means.

7. A beverage brewing apparatus as recited in claim 1, said drive means being connected to said water dispensing means for moving said water dispensing means relative to said receptacle, said chute communicating with said receptacle when said drive means moves said water dispensing means away from said receptacle and said chute being moved out of communication by said water dispensing means when said drive means moves said water dispensing means into communication with said receptacle.

8. A beverage brewing apparatus as recited in claim 1, further comprising a receptacle sensor associated with said receptacle for indicating when said receptacle is in a desired location relative to said brewer.

9. Means for delivering water and dispensing brewing substance for use with a brewing apparatus of the type having a brewing substance dispenser operatively associated with a brewing substance receptacle and a water distribution system communicating with said brewing substance receptacle, said water delivery and brewing substance dispensing means comprising:

a movable chute positioned between said brewing substance dispenser and said brewing substance receptacle for selectively directing brewing substance from said brewing substance dispenser to said brewing substance receptacle;

water dispensing means operatively associated with said water distribution system and selectively communicating with said brewing substance receptacle for delivering water to a brewing substance retained in said brewing substance receptacle; and drive means for selectively alternately moving one of said movable chute and said water dispensing means for controllably displacing the other of movable chute and said water dispensing means, whereby movable chute and said water dispensing means controllably, individually communicate with said receptacle.

10. Means for delivering water and dispensing brewing substance for use with a brewing apparatus as recited in claim 9, further comprising:

said chute having at least one wall;

said brewing substance dispenser having an outlet port through which brewing substance is dispensed;

a hinge attached to said wall of said chute and proximate to said outlet port of said brewing substance dispenser, said chute being movable relative to said hinge for placing said chute in communication with said outlet port.

11. Means for delivering water and dispensing brewing substance for use with a brewing apparatus as recited in claim 10, said brewing substance dispenser further comprising a hopper and a brewing substance grinder positioned for receiving brewing substance from said hopper, said brewing substance grinder dispensing ground brewing substance to said chute.

12. Means for delivering water and dispensing brewing substance for use with a brewing apparatus as recited in claim 10, said water dispensing means including a water line communicating with said water delivery system and a sprayhead attached to said water line, said sprayhead distributing water over brewing substance retained in said brewing substance receptacle.

13. Means for delivering water and dispensing brewing substance for use with a brewing apparatus as recited in claim 12, said water dispensing means further comprising:

sealing means associated with said sprayhead for preventing the escape of moisture from said water dispensing means.

14. Means for delivering water and dispensing brewing substance for use with a brewing apparatus as recited in claim 13, said drive means vertically displaces spray head to disengage said sealing means and horizontally displaces spray head after disengaging said sealing means.

15. Means for delivering water and dispensing brewing substance for use with a brewing apparatus as recited in claim 10, said drive means being connected to said water dispensing means for moving said water dispensing means relative to said receptacle, said chute communicating with said receptacle when said drive means moves said water dispensing means away from said receptacle and said chute being moved out of communication by said water dispensing means when said drive means moves said water dispensing means into communication with said receptacle.

16. A brewing apparatus including beverage brewing means and brewing substance dispensing means, said brewing apparatus comprising:

a receptacle for retaining a brewing substance being positioned relative to said brewing substance dispensing means for receiving brewing substance therefrom and said brewing means for receiving brewing water therefrom;

a sensor operatively associated with said receptacle for indicating when said receptacle is positioned in a desired location relative to said substance dispensing means and said brewing means;

a chute positioned between said substance dispensing means and said receptacle for selectively directing brewing substance from said substance dispensing means to said receptacle;

water dispensing means operatively associated with said beverage brewing means and selectively communicating with said receptacle for delivering water to a brewing substance retained in said receptacle;

drive means being operatively associated with one of said chute and said water dispensing means and for controllably displacing the other of said chute and said water dispensing means, whereby said chute and said water dispensing means controllably, individually communicate with said receptacle; and control means operatively associated with said drive means, said sensor and said substance dispensing means for synchronously operating said brewing apparatus, whereby said sensor must indicate a receptacle positioned in a desired location and said dive means must position said water dispensing means in communication with said receptacle before said beverage brewing means can operate.

17. A brewing apparatus as recited in claim 16, further comprising switch means for selectively controlling said control means for dispensing brewing substance from said substance dispensing means, dispensing brewing substance from said substance dispensing means and dispensing water from said water dispensing means to said receptacle, or dispensing water from said water dispensing means to said receptacle.

18. A beverage brewing apparatus including beverage brewing means and brewing substance dispensing means, said beverage brewing apparatus comprising:

a receptacle for retaining a beverage brewing substance, said receptacle including a filter element, said brewing substance being deposited on said filter element, said filter element retaining a brewing substance and allowing is a brewed fluid to pass therethrough;

said substance dispensing means including a hopper and a brewing substance grinder positioned for receiving brewing substance from said hopper, said brewing substance grinder being operatively associated with said receptacle for controllably dispensing brewing substance into said receptacle;

a sensor operatively associated with said receptacle for indicating when said receptacle is positioned in a desired location relative to said substance dispensing means and said brewing means;

a chute positioned between said brewing substance grinder and said receptacle for selectively directing brewing substance from said brewing substance grinder to said receptacle;

a sprayhead assembly operatively associated with said beverage brewing means and selectively communicating with said receptacle for distributing water to a brewing substance retained in said receptacle;

drive means being connected to said sprayhead assembly for moving said sprayhead assembly relative to said receptacle, said chute communicating with said receptacle when said drive means moves said sprayhead assembly away from said receptacle and said chute being moved out of communication by said sprayhead assembly when said drive means moves said sprayhead assembly into communication with said receptacle, whereby said sprayhead assembly and said chute controllably, individually communicate with said receptacle; and control means operatively associated with said drive means, said sensor and said substance dispensing means for synchronously operating said brewing apparatus, whereby said sensor must indicate a receptacle in location and said drive means must position said sprayhead assembly in communication with said receptacle to operate.

19. A beverage brewing apparatus as recited in claim 18, further comprising switch means for selectively controlling said control means for dispensing brewing substance from said substance dispensing means, or dispensing brewing substance from said substance dispensing means and dispensing water from said sprayhead assembly to said receptacle, or dispensing water from said sprayhead assembly to said receptacle.

20. A beverage brewing apparatus as recited in claim 18, further comprising:

said chute having at least one wall;

said brewing substance grinder dispensing means having an outlet port through which brewing substance is dispensed;

a hinge attached to said wall of said chute and proximate to said outlet port of said brewing substance grinder, said chute being movable relative to said hinge for placing said chute in communication with said outlet port.

21. A beverage brewing apparatus as recited in claim 18, said water dispensing means further comprising:

sealing means operatively associated with said sprayhead assembly and said receptacle for preventing the escape of moisture from said sprayhead assembly.

22. A beverage brewing apparatus as recited in claim 21, said drive means vertically displacing sprayhead assembly for disengaging said sealing means and horizontally displacing said sprayhead assembly after disengaging said sealing means.

* * * * *

UNITED STATES PATENT AND TRADEMARK OFFICE
CERTIFICATE OF CORRECTION

PATENT NO. : 5,465,650
DATED : November 14, 1995
INVENTOR(S) : Brent R. Friedrich and T. Knepler It is certified that error appears in the above-indentified patent and that said Letters Patent is hereby corrected as shown below:

Column 11, Line 58 "dive" should read —drive—

Column 12, Lines 9-10 "allowing is a brewed" should read
—allowing a brewed—

Signed and Sealed this

Thirtieth Day of April, 1996

Attest:

BRUCE LEHMAN

*Attesting Officer*  Commissioner of Patents and Trademarks